Figure 1:
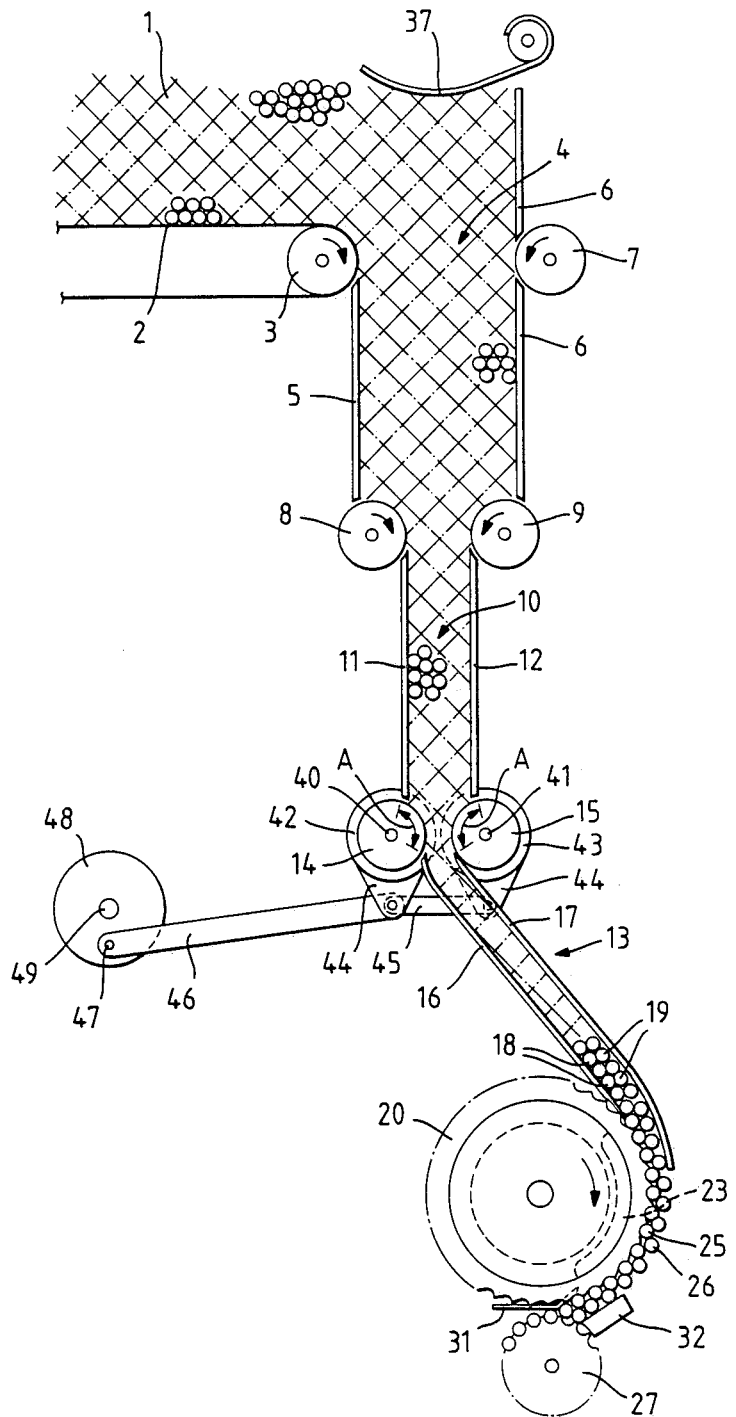

United States Patent [19]
Hinchcliffe et al.

[11] Patent Number: 4,785,928
[45] Date of Patent: Nov. 22, 1988

[54] FEEDING ROD-LIKE ARTICLES

[75] Inventors: Dennis Hinchcliffe; Desmond W. Molins; Stanley V. Starkey, all of London, England

[73] Assignee: Molins PLC, Milton Keynes, England

[21] Appl. No.: 862,737

[22] Filed: May 13, 1986

[30] Foreign Application Priority Data

May 18, 1985 [GB] United Kingdom ............... 8512621

[51] Int. Cl.[4] ............................................. B65G 47/26
[52] U.S. Cl. ................................... 198/450; 198/454; 131/282
[58] Field of Search ........ 198/347, 468.4, 461, 198/471.1, 453–455, 579, 624, 527, 529, 532–534, 542, 550.4, 560–569, 607, 803.5; 131/282, 283

[56] References Cited

U.S. PATENT DOCUMENTS

| | | | |
|---|---|---|---|
| 2,661,830 | 12/1953 | Total | 198/454 |
| 3,189,178 | 6/1965 | Calleson et al. | 131/282 X |
| 3,262,243 | 7/1966 | Molins | 198/803.5 X |
| 3,305,128 | 2/1967 | Dearsley | 198/347 X |
| 3,503,488 | 3/1970 | Stone | 198/454 |
| 4,062,106 | 12/1977 | Hammond et al. | 198/560 X |
| 4,063,633 | 12/1977 | Hall | 198/455 |
| 4,270,670 | 6/1981 | Christiani et al. | 198/550.4 |
| 4,420,073 | 12/1983 | Hausler et al. | 198/579 X |
| 4,583,571 | 4/1986 | Focke et al. | 131/282 X |
| 4,623,059 | 11/1986 | Agnew | 198/452 |

Primary Examiner—Robert J. Spar
Assistant Examiner—Lyle Kimms
Attorney, Agent, or Firm—John C. Smith, Jr.

[57] ABSTRACT

A mass flow of cigarettes is reduced in width as it passes downwardly through chutes into a passage in which the cigarettes are formed as a stream two rows deep. The cigarettes are fed onto a fluted drum and accelerated to form gaps between them, the cigarettes in one row being held by suction in the flutes and those in the other row resting on top of them and being kept in place by suction. From the fluted drum the cigarettes are transferred to a further fluted drum as a single row, by being fed between a stripper and a fixed plate which are positioned so that only one cigarette, from each row alternately, can pass into a flute on the further drum. The cigarettes may then be collated into groups ready for packing.

16 Claims, 2 Drawing Sheets

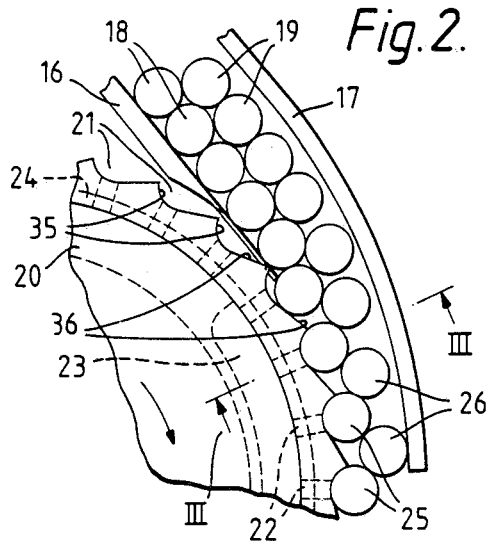
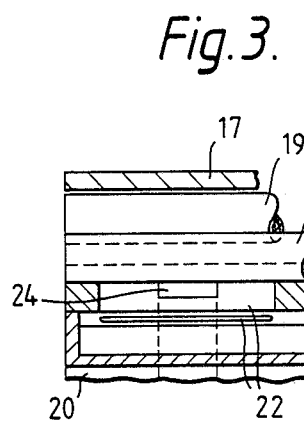
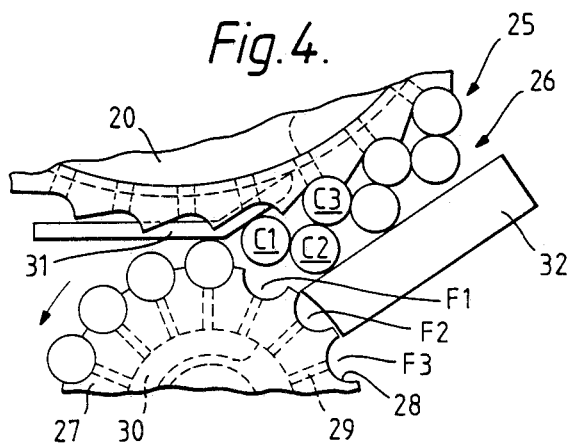
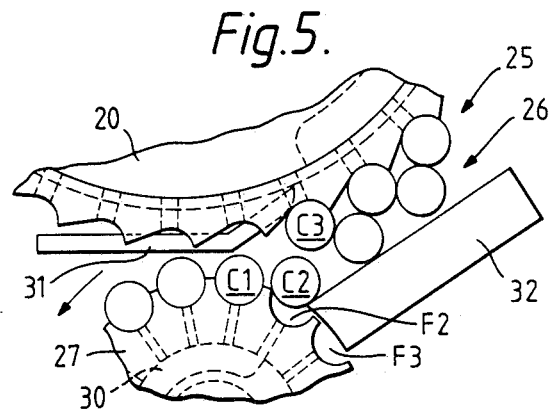

FEEDING ROD-LIKE ARTICLES

This invention is concerned with the feeding of rod-like articles, and in particular with the feeding of cigarettes. It is, however, also applicable to the feeding of other rod-like articles, for example cigarette filter rods or cigars.

In the packing of cigarettes the cigarettes are formed into groups, of a predetermined number, and in one proposed form of cigarette packing arrangement these groups are formed from a regular single row of sideways moving cigarettes. When such a cigarette packing arrangement is supplied with cigarettes from a cigarette making machine via a variable capacity reservoir, the cigarettes are usually fed in the form of a continuous multiple layer stack (a mass flow) which, when fed to the type of packing arrangement mentioned above, must therefore be reduced in height to a single row of cigarettes.

According to one aspect of the present invention there is provided a method of forming a regular single row of cigarettes moving transversely to their axes, comprising the steps of forming a stream two rows deep and with adjacent cigarettes in each row substantially in abutting relationship; accelerating the two rows to provide a space of less than the diameter of a cigarette between each pair of adjacent cigarettes in each row and so that each cigarette in one row nests against two such spaced adjacent cigarettes in the other row; further accelerating the two rows of cigarettes to increase said space to at least one cigarette diameter; and removing cigarettes alternately from each of said two rows to form a single row.

According to a further aspect of the invention there is provided apparatus for forming a regular single row of cigarettes moving transversely to their axes, comprising means for forming a stream two rows deep and with adjacent cigarettes in each row substantially in abutting relationship; first conveyor means to accelerate said two rows of cigarettes to provide a space of less than the diameter of a cigarette between each pair of adjacent cigarettes in each row and so that each cigarette in one row nests against two such spaced cigarettes in the other row; and second conveyor means movable at a higher speed than said first conveyor means to further accelerate said two rows of cigarettes from said first conveyor means to increase said space to at least one cigarette diameter, said second conveyor means removing cigarettes alternately from each of said two rows on said first conveyor means to form said single row.

The invention will now be described, by way of example only, with reference to the accompanying drawings in which:

FIG. 1 is a diagrammatic side view of apparatus for feeding cigarettes according to the invention, FIG. 2 is a detail of part of the apparatus of FIG. 1 and drawn to a larger scale, FIG. 3 is a section on the line III—III of FIG. 2, FIG. 4 is a detail of a different part of the apparatus of FIG. 1 and drawn to a larger scale, and FIG. 5 is a view similar to FIG. 4 with some of the parts shown in a different position.

Referring first to FIG. 1, a continuous stack 1 of cigarettes is supported on, and fed to the right by, a conveyor band 2 which is trained around a roller 3. Beyond the band 2 the cigarettes are fed downwards through a chute 4 defined by fixed walls 5, 6, the wall 6 being extended upwardly in front of the stack 1. A roller 7 projects through a gap in the wall 6 in line with band 2, and is driven at the same speed as the band 2, but in the opposite sense, to urge the cigarettes down the chute 4.

From the bottom of chute 4 the cigarettes are fed by a pair of contra-rotating rollers 8, 9 down through a further chute 10 defined by fixed walls 11, 12. The chute 10 is narrower than chute 4: thus the walls 5, 6 are so spaced as to allow a column ten cigarettes wide to pass between, whilst the walls 11, 12 allow a column four cigarettes wide to pass between them. In order to keep the rate of flow of cigarettes passing down chute 10 the same as that passing down through chute 4, the rollers 8, 9 are driven at a proportionately higher speed than the band 2 and roller 7.

From the bottom of chute 10 the cigarettes are fed into a downwardly sloping passage 13 by a further pair of contra-rotating rollers 14, 15 which are spaced apart so as to allow only two cigarettes at a time to pass therebetween and thus form a stream of cigarettes two rows deep. The rollers 14, 15 are driven alternately in 45° steps and for this purpose they are fixed respectively to spindles 40, 41 which also have fixed thereon respective free-wheel devices 42, 43. When each of these devices is turned in one direction, its spindle turns in one direction and, when it is turned in the opposite direction, it free-wheels and no drive is transmitted to that spindle. The devices 42, 43 are mounted on the spindles 40, 41 so that when they are rotated, as will be described later, the spindle 40 is driven in a clockwise direction, and the spindle 41 is driven in an anti-clockwise direction. One form of such free-wheel devices is that known as a sprag clutch.

An extension 44 is formed on each device 42, 43 and the outer ends of the extensions are connected by an arm 45. The outer end of the left hand extension 44 is also connected to one end of a lever 46, the other end of which is carried on a pin 47 eccentrically mounted on a crank disc 48 continuously rotated by a shaft 49. As disc 48 rotates the devices 42, 43 are caused to swing in unison about the axis of their respective spindles 40, 41. As they swing to the left in FIG. 1, the spindle 40 and thus also the roller 14 are driven through an angle of 45° in a clockwise direction by device 42, whilst the roller 15 remains stationary due to the device 43 free-wheeling. As they swing to the right, roller 15 is driven through an angle of 45° in an anti-clockwise direction whilst the roller 14 remains stationary due to the device 42 free-wheeling.

Alternatively the rollers 14, 15 may be driven continuously.

Suction is applied to the rollers 14, 15 over an angle A as shown in FIG. 1. The passage 13 comprises parallel lower and upper walls 16, 17 spaced apart by slightly more than two cigarette diameters so that the cigarettes in passage 13 form into a stream comprising respectively lower and upper rows 18, 19, and are in abutting relationship. The passage 13 is arranged at an angle of 40° to the vertical.

Referring now also to FIGS. 2 to 5, at the downstream end of the passage 13 the two rows of cigarettes are fed tangentially onto a rotatable drum 20 provided about its periphery with axial flutes 21, the drum being driven in a clockwise direction so as to accelerate the cigarettes in the direction of feed. The flutes are shaped with a cigarette engaging curved portion 35 and a straight portion 36 extending tangentially therefrom in the direction of rotation of the drum 20. Each flute 21 is provided with a pair of radial slots 22 (only one of each aligned pair being shown in the drawings) to which suction is applied as the flutes pass over a stationary suction chamber 23 which is connected to a convenient source of suction, not shown. The drum 20 also has formed in its periphery two circumferential grooves 24 (only one being shown in FIG. 3), the grooves 24 being located mid-way along each set of suction slots 22, as shown in FIG. 3.

As cigarettes of the lower row 18 drop away from the end of the lower wall 16 and enter successive flutes 21, suction is applied to each successive flute 21 by the respective pair of slots 22 passing over the suction chamber 23, so that the cigarettes of the lower row 18 are drawn into, and held against the curved portions 35 of, the flutes 21. The flutes are so spaced that a gap of less than the diameter of a cigarette is created between successive cigarettes. This allows the cigarettes of the upper row 19 to nestle between the cigarettes in flutes 21, as shown in FIG. 2, so that the cigarettes are formed on the drum 20 into a formation consisting of inner and outer rows 25, 26 of cigarettes. The cigarettes in the outer layer 26 are held in position by suction applied between the cigarettes of inner layer 25. This is made possible because the circumferential grooves 24 communicate with the slots 22.

Positioned below the drum 20 is a further rotatable drum 27 having peripheral flutes 28 and which is driven in an anti-clockwise direction at a higher speed again than drum 20 so as to further accelerate the cigarettes. Suction is applied to the flutes 28 as slots 29 pass over a stationary suction chamber 30. As the cigarettes on drum 20 approach the drum 27, suction is cut off from flutes 21 as the slots 22 pass away from suction chamber 23, and the cigarettes in inner layer 25 are moved out of the flutes 21 by a stripper 31. At the same time the cigarettes in outer layer 26 contact a fixed plate 32, which is positioned relative to the stripper 31, so that only one cigarette at a time can pass into a flute 28 on the drum 27.

In FIG. 4 a cigarette C1 in inner layer 25, has been lifted from its flute in drum 20 by stripper 31 and is moving towards a flute F1 in the drum 27, a cigarette C2 in layer 26, being prevented from passing between cigarette C1 and plate 32. In FIG. 5 the cigarette C1 has dropped into flute F1, and cigarette C2 has moved along plate 32 and is about to drop into flute F2 in drum 27. The next cigarette C3 in inner layer 25, is just contacting stripper 31 and will drop into flute F3.

In this way a single row of cigarettes is formed on the drum 27, which are then fed to further apparatus, which forms no part of the present invention, for collating the cigarettes into groups ready for packing.

In order to keep the chute 4 full of cigarettes, a sensor 37 is provided to rest on top of the stack 1 above chute 4, the angular position of the sensor being used, in known manner, to control the speed at which conveyor band 2 is driven, and thus the rate at which cigarettes are fed towards the chute 4.

We claim:

1. A method of forming a regular single row of cigarettes moving transversely to their axes, comprising the steps of forming a stream two rows deep and with adjacent cigarettes in each row substantially in abutting relationship; accelerating the two rows to provide a space of less than the diameter of a cigarette between each pair of adjacent cigarettes in each row and so that each cigarette in one row nests against two such spaced adjacent cigarettes in the other row; sequentially removing said cigarettes from alternate of said two rows and simultaneously further accelerating the cigarettes to increase their spacing to at least one cigarette diameter so as to form a single row.

2. A method according to claim 1 in which said stream is formed by reducing a mass flow of cigarettes to a depth of two rows.

3. Apparatus for forming a regular single row of cigarettes moving transversely to their axes, comprising means for forming a stream two rows deep and with adjacent cigarettes in each row substantially in abutting relationship; first conveyor means to acelerate said two rows of cigarettes to provide a space of less than the diameter of a cigarette between each pair of adjacent cigarettes in each row and so that each cigarette in one row nests against two such spaced cigarettes in the other row; and second conveyor means movable at a higher speed than said first conveyor means to further accelerate said two rows of cigarettes from said first conveyor means to increase said space to at least one cigarette diameter, said second conveyor means being arranged to sequentially remove cigarettes from alternate of said two rows on said first conveyor means to form said single row.

4. Apparatus as claimed in claim 3 in which said forming means comprises a downwardly sloping passage defined by two opposed walls spaced apart by a distance of between two and three cigarette diameters.

5. Apparatus as claimed in claim 4 in which said passage slopes downwardly at an angle of approximately 40° to the vertical.

6. Apparatus as claimed in claim 5, in which said first conveyor means comprises a rotatable drum to which said two rows of cigarettes are fed tangentially, the periphery of said drum being provided with flutes into which the cigarettes of said one row are fed.

7. Apparatus as claimed in claim 6 further comprising radial slots in said drum through which suction is applied to said flutes to hold the cigarettes of said one row therein, and means to apply suction between spaced adjacent cigarettes of said one row so as to hold the cigarettes of said other row nested against the cigarettes of said one row.

8. Apparatus as claimed in claim 7 in which said suction applying means includes a circumferential groove in said drum which connects with said radial slots.

9. Apparatus as claimed in claim 8, in which said second conveyor means is a further rotatable drum having peripheral flutes thereon, wherein successive flutes receive cigarettes from alternate rows of said two rows of cigarettes on said first conveyor means.

10. Apparatus as claimed in claim 9 in which said second conveyor means includes stripper means to remove cigarettes from the flutes of said rotatable drum, and restrictor means spaced from said stripper means so that only one cigarette at a time can pass into a flute on said further rotatable drum.

11. Apparatus as claimed in claim 10, further comprising means to feed a mass flow of cigarettes towards said first conveyor means, and means to reduce the depth of said mass flow so as to form said stream.

12. Apparatus as claimed in claim 11 in which said reducing means comprises a pair of rollers spaced apart by a distance such that no more than two cigarettes at a time can pass between them, and means to rotate said rollers intermittently in alternation.

13. Apparatus as claimed in claim 12 in which said rotating means includes a free-wheel device associated with each of said rollers, and means to operate said devices in unison such that as they are operated in one direction, one of said rollers is rotated in a clockwise direction and the other of said rollers remains stationary, and as they are operated in the other direction, said other roller is rotated in an anti-clockwise direction and said one roller remains stationary.

14. Apparatus for forming a regular single row of cigarettes moving transversely to their axes, comprising means to feed a mass flow of cigarettes along a path, means along said path to reduce the depth of said mass flow to form a stream of said cigarettes two rows deep and with adjacent cigarettes in each row substantially in abutting relationship, said reducing means comprising a pair of rollers spaced apart by a distance such that no more than two cigarettes at a time can pass between them and means to rotate said rollers intermittently in alternation; first conveyor means to accelerate said two rows of cigarettes to provide a space of less than the diameter of a cigarette between each pair of adjacent cigarettes in each row and so that each cigarette in one row nests against two such spaced cigarettes in the other row; and second conveyor means movable at a higher speed than said first conveyor means to further accelerate said two rows of cigarettes from said first conveyor means to increase said space to at least one cigarette diameter, said second conveyor means being adapted to remove cigarettes alternately from each of said two rows on said first conveyor means to form said single row.

15. Apparatus for forming along a path a regular single row of cigarettes moving transversely to their axes, said cigarettes having a predetermined diameter, comprising:
 (a) means for forming a stream of two rows of cigarettes with adjacent cigarettes in each row substantially in abutting relationship;
 (b) first conveyor means adapted to accelerate said two rows of cigarettes along said path to a first predetermined speed to provide a space of less than said predetermined diameter of said cigarettes between each pair of adjacent cigarettes in each row so that each cigarette in one row nests against two such spaced cigarettes in the other row; and
 (c) second conveyor means adapted for movement at a higher predetermined speed than said first predetermined speed of said first conveyor means to further accelerate said two rows of cigarettes from said first conveyor means along said path to increase said space between each pair of adjacent cigarettes in each row to at least the diameter of a cigarette;
 (d) said second conveyor means being arranged to sequentially remove cigarettes from alternate of said two rows of cigarettes on said first conveyor means to form said single row.

16. A method of forming a regular row of cigarettes moving along a path transversely to their axes, said cigarettes having a predetermined diameter, comprising the steps of:
 (a) forming a stream of two rows of cigarettes with adjacent cigarettes in each row substantially in abutting relationship while conveying said cigarettes in a downwardly sloping direction along said path;
 (b) accelerating said two rows of cigarettes along said path to a first predetermined speed to provide a space of less than said predetermined diameter of said cigarettes between each pair of adjacent cigarettes in each row so that each cigarette in one row nests against two such spaced adjacent cigarettes in the other row;
 (c) sequentially removing said cigarettes from alternate of said two rows and simultaneously further acelerating said cigarettes to increase said space between each pair of adjacent cigarettes in each row to at least the diameter of a cigarette so as to form a single row of said cigarettes.

* * * * *